UNITED STATES PATENT OFFICE.

ERIK LUDVIG RINMAN, OF HARNÄS, SWEDEN.

PROCESS OF TREATING WASTE LIQUORS FROM PULP-MILLS.

1,196,290. Specification of Letters Patent. Patented Aug. 29, 1916.

No Drawing. Application filed March 12, 1912. Serial No. 683,304.

*To all whom it may concern:*

Be it known that I, ERIK LUDVIG RINMAN, a subject of the King of Sweden, residing at Harnäs, in the Kingdom of Sweden, have invented new and useful improvements in processes of treating waste liquors from pulp-mills in order to regenerate the sodium carbonate and recover valuable by-products, of which the following is a specification.

The invention is based on the fact discovered by me that the waste liquors or so-called black liquors from soda or sulfate pulp mills chiefly contain, besides ulmic compounds and ulmic acids, alipathic organic oxygen-acids whose salts, ulmic compound salts and ulmic acid salts as well as oxygen-acid salts, heated with a strong basic hydrate, and form valuable volatile products, such as alcohols, aldehydes, ketones, hydrocarbons, etc., and corbonates of the alkalis and basic hydrates present.

The invention in its simplest form consists in exposing the black liquors from soda or sulfate pulp mills, after the removal of the water, to dry distillation in the presence of a strong basic hydrate, for instance hydroxid of sodium or slaked lime ($CaO_2H_2$), intimately mixed therewith. If the evaporation of the black liquor has been performed in such a manner that during this process carbon dioxid has not been supplied, the residue of evaporation contains caustic soda, which, in the case of a sufficient quantity thereof, may allow the desired reactions to take place during the dry distillation of the residue after evaporation. Generally, however, this is not the case in the production of pulp since it would happen only if the raw material were perfectly dissolved during the process of boiling. The usual condition in producing the pulp is such that the black liquors do not contain caustic alkali sufficient for the reaction. It is generally necessary to add to the liquor, and to intimately mix with it, a suitable quantity of one or more than one strong basic hydrate such as a hydrate of sodium, calcium, magnesium, zinc, iron, etc. In such cases where hydrate of lime is used for the reaction and where it is desired to add the lime to the liquor in the form of oxid, care should be taken that this oxid be slaked in the liquor before the dry distillation is begun. The mixture thus obtained is exposed to dry distillation in suitable apparatus.

A good result is obtained if the distillation is performed in the presence of steam, preferably superheated. Also the use of an increased or a decreased pressure seems to have a favorable influence on the distillation. The organic substances of the black liquor, ulmic compounds and ulmic acids as well as oxygen-acids, then form carbon and volatile substances which may be partly condensed at ordinary temperature, such as alcohols, aldehydes, ketones, phenols, hydrocarbons, and partly consist of gases of a high combustion value and which may therefore advantageously be used for creating the heat required for the distillation process. The volatile condensable gases may be recovered by known methods. They may, for instance, be separated on account of their different solubility in water (higher alcohols, ketones, phenols, and hydrocarbons from aldehyde, acetone, isopropylalcohol, wood spirit and common alcohol), by fractional distillation or by distillation with steam of lower or higher temperature. The residue of dry distillation consists of sodium carbonate, carbonates of bases added, and carbon.

The byproducts will be recovered to better advantage, and a more homogeneous liquor will be obtained if, before the dry distillation, the liquor is boiled together with the strong basic hydrate in the presence of which the distillation should take place. This boiling operation should preferably take place at increased pressure for instance at a temperature of about 180° C. (10 kg.). In this manner the ulmic compounds may be boiled separately before their dry distillation.

In order to recover the sodium carbonate the residue of distillation is washed with water, whereby the sodium carbonate is dissolved, while the carbon and insoluble carbonates remain undissolved. After causticizing the solution of sodium carbonate may be used as a fresh lye for boiling further quantities of cellulose matters. When the strong basic hydrate, added to the black liquor for the purpose of dry distillation, consists of hydroxid of sodium carbonate of sodium will be formed which will dissolve in the liquor. In this case the undissolved residue consists of carbon powder, the purity of which is great if the black liquor is causticized for instance by lime before the dry distillation. Such a causticizing is necessary when the hydroxid of sodium, needed for the dry distillation is added to the diluted black liquor in the form of soda (carbon-soda from a previous dry distillation); it is also to be recommended in order that in the black liquor the soda—present already in the white liquor—may be transformed into hydroxid of sodium; the latter procedure is of importance partly in order to obtain white liquor of sufficient strength direct through causticizing with lime without evaporation and partly because the black liquor can be concentrated without precipitating ulmic compounds which is liable to happen if the whole quantity of soda is added before the concentration of the liquor.

When the added strong basic hydrate is not or partly not an alkali, but for instance consists of slaked lime ($CaO_2H_2$) the carbon obtained will of course be mixed up with carbonate of calcium. In this case carbon containing a smaller amount of lime may be separated from the greater mass of lime for instance by washing with water or air.

A more economical way than directly evaporating the liquor to dryness and thereupon distilling it in the manner set forth is the following, especially if black liquors from wood boiling are to be treated. Before the black liquor is concentrated to dryness, the organic acids which in free state are insoluble in water, the socalled ulmic compounds, are precipitated and separated from the liquor independent of in which manner the separation be effected. This separation of the ulmic compounds is of great importance since it has been found that said compounds distilled with a strong basic hydrate, especially sodium hydrate, give off wood-spirit only containing small quantities of acetone as impurity. If, on the other side, the ulmic compounds are distilled with the other part of the lye, the wood-spirit will contain common alcohol, as impurity, which is more difficult to separate.

The part of the black liquor separated from the ulmic compounds contains more analogous acids whose salts, distilled over with a strong basic hydrate, such as hydroxid of sodium or slaked lime ($CaO_2H_2$) separately or together, give off aldehyde, acetone, isopropylalcohol, wood-spirit, spirit, higher alcohols and ketones, hydrocarbons and combustible gases, etc. The utilization of the black liquor is, therefore, suitably effected in such a manner that the said liquor is concentrated by suitable apparatus (apparatus for repeated evaporation) as much as possible. Before or during the evaporation of the black liquor to dryness, the strong basic hydrate or hydrates to be used, for instance hydroxid of sodium or slaked lime, are to be added to the liquor. If desired, the strong basic hydrate may be added to the residue of evaporation, but the former method is preferred. When the strong basic hydrate consists in soda lye it is preferably prepared in such manner that already when the ulmic compounds are precipitated the black liquor is provided with the necessary quantity of soda (soda and carbon from a previous dry distillation); the soda lye for dry distillation is then obtained by causticizing the black liquor with, for instance, lime. In this case the impurities contained in the lime are separated, and the further advantage is obtained that the ulmic compounds can mix with and take up all the carbon powder present in the quantity of soda added for the purpose of the dry distillation. The mixture, obtained in this manner, of black liquors and strong basic hydrates, for instance hydrate of soda or slaked lime is then exposed to dry distillation in suitable apparatus, preferably in the presence of steam which may be superheated and at normal, reduced or increased pressure.

The quantity of acetone and spirit is increased according as the distillation is cautiously effected. The distillation may with the same or slightly reduced output even be performed below 400° centigrade (the dry distillation, however, requires a temperature of at least 250° centigrade in order to be practically performable, since below this temperature only traces of the reaction desired can be disclosed) so that the sodium acetate in the black liquor is not decomposed but only the other organic substances, in which case the sodium acetate may be extracted from the residue of distillation by a suitable solvent, such as woodspirit, which does not dissolve sodium carbonate, sodium chlorid, etc. The output of valuable products of distillation is also increased with the quantity of the strong basic hydrate added, but obviously not by addition of a greater quantity than that partaking in the reaction. If the strong basic hydrate consists of hydrate of soda or slaked lime a surplus thereof is, however, not lost but is recovered in the form of an equivalent quantity of caustic soda, when the residue of dry distillation is washed with water. The volatile substances obtained by the said dry distillation consist, besides of combustible gases, chiefly of aldehydes, acetone, isopropylalcohol, wood-spirit, spirit, higher alcohols and ketones, and hydrocarbons. These substances are recovered by known methods and may be used in mixture, for instance as a motor fuel, or separate for different purposes, or mixed with each other in suitable combinations. When it is desired to reduce some of the volatile products of distillation, for instance aldehyde and ketone into alcohol, this can be accomplished by bringing the hot gases in contact with suitable contact substances for instances nickel.

On the other hand if the greatest possible output of acetone is desired, this can be done by bringing the gases, formed by the dry distillation and while retaining their high temperature, into contact with certain substances, when the isopropylalcohol present in the gases will be decomposed into acetone and hydrogen. Metallic copper or carbon, for instance the still hot carbon powder mixed with soda if desired, with insoluble carbonates which is formed by the distillation may serve as suitable contact substance for this purpose.

As to the operation of the said dry distillation the following details should be mentioned. The substances in question are difficult to obtain in a condition free from water. This is especially true in regard to the salts of sodium, which after concentration will form tough masses, difficult to distil in ordinary retorts and in thick layers. These materials should therefore be dried in thin layers and at a sufficiently high temperature so that they will not melt or soften when heated and distilled in retorts or apparatus of the usual type. Since the dry distillation will give the best result if performed in the presence of steam, it is recommended that the last drying of the liquor and the dry distillation be performed in thin layers in one and the same operation. This is preferably done in such manner that the solution of salt to be dry-distilled is concentrated just so far that it contains the amount of water which should be present as steam during the process of distillation and is then introduced in thin layers into the retort. It is then easy to carry on the dry distillation continuously, for instance in such way that the solution, which is to be dried and dry-distilled, is sprinkled through a rotating nozzle as a fine rain onto the hot walls of the retort, the residue in the meantime being scraped off from the walls by means of rotating scrapers. The retort can of course be arranged to rotate, and the nozzle and scrapers be stationary. In this case the retort should naturally be of round shape; otherwise it may be provided with flat, cylindrical or conical surfaces. The subdividing of the solution into thin layers within the retort may also be accomplished in such way that the solution is allowed to flow or slowly run into the retort in a stream or streams. For instance, the retort may be shaped like a funnel upon the conical walls of which the solution is injected or sprinkled, while the residue is removed by scrapers through the mouth of the funnel, to be taken up in a conveyer unless the distillation be completely finished within the funnel. According to the manner in which the solution is introduced into the funnel, the value of the angle of its conical part may be considerably varied, up to 180°.

In the described processes of regenerating the sodium carbonate of black liquors and simultaneously recovering valuable by-products, the loss of sodium carbonate which cannot be avoided must be compensated by new quantities in the form of caustic soda or sodium carbonate or, if desired, bicarbonate of soda. If, on the other hand, the principles of the Leblanc process are employed, lost soda may be compensated by new quantities of sodium sulfate, which in such case is to be reduced for instance by the carbon of the residue of dry distillation. Inasmuch as the use of sulfate lye entails great drawbacks in the form of a bad odor and less valuable by-products more difficult to purify, the pure soda-process is, however, to be preferred.

I claim—

1. The process of treating black liquors from pulp mills so as to regenerate the sodium carbonate and recover aldehydes, ketones and alcohols which comprises dry distillation of salts of organic acids contained in the said liquors intimately mixed with a strong basic hydrate in the presence of preferably superheated steam.

2. The process of treating black liquors from pulp mills so as to regenerate the sodium carbonate and recover aldehydes, ketones and alcohols which comprises dry distillation of salts of organic acids contained in the said liquors intimately mixed with hydrate of lime in the presence of preferably superheated steam.

ERIK LUDVIG RINMAN.

Witnesses:
K. E. WIBERG,
FREDR. NORDSJO.